United States Patent
Ungermann et al.

[11] Patent Number: 6,134,114
[45] Date of Patent: Oct. 17, 2000

[54] VERTICALLY ASSEMBLED CHIP CARD READER

[75] Inventors: Heinz Ungermann, Linsengericht; Arnd Bäcker, Hellenthal; Dieter Klatt, Wülfrath, all of Germany

[73] Assignee: Stocko Metallwarenfabriken Henkels und Sohn GmbH & Co, Germany

[21] Appl. No.: 09/253,074

[22] Filed: Feb. 19, 1999

[30] Foreign Application Priority Data

Feb. 20, 1998 [EP] European Pat. Off. .............. 98102950

[51] Int. Cl.[7] .............................. H05K 1/14; G06K 19/06
[52] U.S. Cl. .......................... 361/737; 361/728; 361/741; 361/752; 439/945; 235/486
[58] Field of Search ..................................... 361/728, 736, 361/737, 741, 752, 753, 756, 796, 801, 802; 439/76.1, 928.1, 946, 945; 235/486, 492; 220/4.02; 211/41.17; 206/706

[56] References Cited

U.S. PATENT DOCUMENTS

| | | | |
|---|---|---|---|
| 5,475,919 | 12/1995 | Wu et al. | 29/841 |
| 5,674,080 | 10/1997 | Takemura | 439/159 |
| 5,752,857 | 5/1998 | Knights | 439/638 |
| 5,936,222 | 8/1999 | Korsunsky et al. | 235/441 |
| 5,969,330 | 10/1999 | Korsunsky et al. | 235/486 |

FOREIGN PATENT DOCUMENTS

| | | |
|---|---|---|
| 0 552 078 A1 | 7/1993 | European Pat. Off. . |
| 296 07 253 | 4/1996 | Germany . |
| 296 15 553 U1 | 12/1996 | Germany . |
| 95 02499 | 1/1995 | WIPO . |
| 97 38443 | 10/1997 | WIPO . |

Primary Examiner—Jayprakash N. Gandhi
Attorney, Agent, or Firm—Robert W. Becker & Associates

[57] ABSTRACT

A contacting unit has a housing consisting of a base plate and a cover plate with a plastic frame. A printed circuit board, having a strip plug for contacting a computer slot and a contact field for contacting a chip card, is mounted between cover plate and base plate that such between the printed circuit board and the base plate an insertion channel is defined and such that the strip plug is located at a first narrow side of the housing. The printed circuit board is secured by the plastic frame. The insertion channel has an insertion guide located at the opposite narrow housing side. The base plate and the cover plate are separate stamped sheet metal parts, and at least the longitudinal edges have inwardly bent tabs. The base plate has plastic holders for securing opposite ends of the strip plug. The insertion guide is a profiled plastic member having a length matching the length of the narrow side. It is connected to the base plate and has an insertion slot allowing passage of a chip card into the insertion channel. The profiled plastic member has a platform projecting into the housing and providing a support surface for the printed circuit board. The plastic holders and the profiled plastic member are injection molded onto the tabs of the base plate. The plastic frame is injection-molded to the tabs of the cover plate. The cover plate and the base plate are fastened to one another by an adhesive, ultrasound welding or hot-pressing.

11 Claims, 6 Drawing Sheets

VERTICALLY ASSEMBLED CHIP CARD READER

BACKGROUND OF THE INVENTION

The present invention relates to a contacting unit for a card-shaped support element for electronic components (printed circuit board), especially according to PCMCIA standard, that comprises, in addition to the strip plug of the printed circuit board at the narrow side of the card, a contact field at a surface of the printed circuit board for contacting a chip card. The chip card is introduced parallel to the printed circuit board into a slot-shaped insertion channel which is positioned between the base plate of the housing and the printed circuit board. It is open at the longitudinal sides and has an insertion guide at the narrow side of the housing opposite the strip plug. The printed circuit board is secured by a plastic frame which is arranged at the cover plate of the housing. The invention further relates to a method for producing such a contacting unit.

A contacting unit of the aforementioned kind is known from German Gebrauchsmuster 296 07 253. A card-shaped support element according to PCMCIA standard is arranged in a housing and can be inserted into a matching slot of a computer, especially a notebook computer, whereby electrical contacting is realized by a strip plug arranged at the leading end of the housing. The housing of the known contacting unit is also designed to receive a chip card in a slot-shaped insertion channel of the housing of the contacting unit which extends parallel to the printed circuit board. The chip card can be read by a contact field arranged the face of the printed circuit board. The combination of a PCMCIA card and chip card contacting unit to be inserted into a matching modular slot of a computer for reading is already known form European patent application 0 552 078 for various applications, for example, electronic banking, pay TV, securing of access authorization to computers or data networks, memory expansion etc. A disadvantage is that the known chip card readers of the aforementioned kind have a widened housing portion in the form of an enlarged insertion guide for the chip card which projects from the insertion area of the modular receiving slot of the computer. Such a projecting portion at the same time provides a handling strip for the user. However, the reading devices are thus considerably longer than the standardized PCMCIA card and project in the operating position with the widened slotion from the receiving slot of the notebook so that there is a risk that, during mobile handling, the contacting unit can jam within the slot and can be bent or even broken off. Such a widened slotion has been considered necessary in order to provide for safe guiding of the chip card into the slot-shaped insertion channel and to ensure proper insertion without canting, i.e., to insure proper insertion, securing and removal of a chip card.

With the increased use of lap top computers, notebook computers and similar transslotable computers, there is a technical necessity to be able to insert a chip card reader completely into the receiving slot of the computer into the operating position without having projecting parts that could impair handling of the computer. This is especially important where data protection on a portable computer is of utmost importance in that access to the system is only possible when the correct password has been entered and a personal chip card, for example, a smart card of the size of a conventional telephone card, is inserted into the reader and the reader is inserted with the chip card that contains the access authorization into the PCMCIA slot of the computer. It would be very cumbersome for manipulation of the thus operation-ready computer when projecting parts of the chip card reader were still present. The complete insertion of the reader into the PCMCIA slot of the computer is thus an important feature for success in the marketplace. The conventional contacting units can not fulfill this requirement.

It is therefore an object of the present invention to provide a chip card reader which can be completely received in the receiving slot of the computer, i.e., can be inserted into the PCMCIA slot completely without projecting portions whereby despite the shorter embodiment of the reader a safe insertion guide for the chip card is provided and mechanical stability is ensured while its manufacture is simple.

SUMMARY OF THE INVENTION

The object of the present invention is solved for a contacting unit of the aforementioned kind with the following features.

1. The base plate and the cover plate are separate individual sheet metal parts that are riot connected to one another, but have inwardly bent tabs at the longitudinal sides and/or the narrow sides.
2. The edges of the base plate are provided at the location of the strip plug with plastic holders for securing the strip plug and the insertion side of the base plate has a profiled plastic member extending over the entire length of the narrow side and forming the insertion guide for the chip card, whereby an insertion slot for the chip card opening into the insertion channel is provided. The profiled plastic member has an inwardly projecting platform above the slot opening for securing the printed circuit board flush with the insertion opening.
3. The plastic holders and the profiled plastic member are injection-molded to the corresponding tabs of the base plate so that the plastic elements form a unitary part with the base plate.
4. The cover plate is provided at its inwardly facing side with a plastic frame which is injection molded to the corresponding tabs at the cover plate so that the plastic frame forms a unitary part with the cover plate.
5. The cover plate and the base plate are connected to one another via the respective plastic elements by a plastic connection such as an adhesive, ultrasound welding, or hot-pressing.

With the inventive features it is possible to provide an extremely short contacting unit having a length and width matching the PCMCIA standard type II and which can be inserted completely into the PCMCIA slot of a computer, especially a notebook, without having projecting portions. The complete insertability also improves the contacting safety for the reader and prevents any risk of damage even during transport whereby, as is conventional, it is possible to provide a protective cover which then closes off the insertion slot once the reader has been inserted.

Preferably, the plastic elements of the cover plate (frame) and of the base plate (holders, profiled member) are provided with matching positioning projections and positioning recesses as well as connecting elements such as adhesive surfaces or energy directing sensors for ultrasound welding. A simplification of the assembly as well as an increase of the stability of the reader are achieved with the inventive features.

An important feature of the invention is that the base plate and the cover plate are provided with tabs projecting from the plane of the plate and bent inwardly which are used to connect the plastic elements thereto by injection molding to thus form a unitary embodiment of the cover plate or base plate with their respective plastic elements. The assembly of the unitary parts to form the complete reader enclosing the electronic components is carried out by plastic connecting techniques so that an extremely short and stable unit is produced. It is advantageous to provide L-shaped tabs which are stamped from the sheet metal parts and are then bent into the desired position. The number and arrangement of the tabs at the base plate and at the cover plate complement one another, whereby it is expedient to provide the cover plate with a plurality of such tabs for attaching the plastic frame while the base plate has tabs at the narrow side for the insertion guide in the form of the profiled plastic member and also brackets or spring elements provided at the opposed ends of the profiled member whereby these brackets or spring elements delimited the insertion slot laterally and thus provide a lateral guiding action for the chip card to be inserted. The metal brackets or spring elements are to be embodied very thin and this allows to produce the profiled plastic member with dimensions corresponding to the size requirements of the PCMCIA standard and to thus avoid a lateral widening without impeding the guiding function for the chip card to be inserted.

It should be noted that it is, in principle, also possible to provide separate securing elements instead of the stamped and bent tabs or spring elements or brackets consisting of the same material as the base plate and the cover plate. They must then be connected mechanically to the respective cover plate or base plate.

The profiled plastic member is advantageously a monolithic part and has a substantially U-shaped cross-section whereby the open side of the U-shaped cross-section defines the insertion slot. The bottom portion of the U-shaped cross-section has a penetration corresponding to the width of the chip card to thereby provide an opening into the insertion channel. Above the thus formed insertion slot a platform is provided at the profiled member which projects inwardly (into the housing) and is used as a securing means for the printed circuit board in order to provide a flush arrangement of the printed circuit board at the insertion slot. The platform has positioning recesses which receive projecting positioning elements of the printed circuit board in a flush manner.

This ensures that an unobstructed insertion channel for the chip card is provided and that its chip contact field will contact securely the contact field of the printed circuit board when inserted. Advantageously, the plastic holders of the base plate are embodied as axial abutments for limiting the insertion depth of the chip card and thus provide exact positioning of the chip card.

Another feature for shortening the constructive length of the chip card reader is to embody the U-shaped plastic frame at its closed side in the form of a narrow strip (connecting bar) which matches the platform of the profiled plastic member. The free ends of the legs of the U-shaped frame can also be embodied so as to match the shape of the plastic holders at the base plate in order to simplify positioning and connecting the housing parts to one another and to also improve securing of the PCMCIA strip plug in the housing.

According to another inventive suggestion, the base plate is provided at its inner side (facing the interior of the housing) with a thin reinforcement plate made of metal or plastic, optionally having a spring action, which can be connected to the base plate by an adhesive or by welding or can be injection molded in the case of a plastic plate together with the other plastic elements of the base plate.

The method of the present invention is characterized by the following steps:

The outer housing plates (base plate, cover plate) are as stamped as separate, individual sheet metal parts in a first method step whereby at the base plate and the cover plate tabs and brackets are stamped and then bent inwardly.

The base plate, respectively, the cover plate in a second method step are separately provided with plastic holders and plastic profiled members, respectively, the plastic frame in an injection molding process in order to form respective unitary metal/plastic parts.

The printed circuit board with its strip plug is then placed from above onto the base plate (i.e., vertical assembly) thus forming the insertion channel for the chip care and is received within the profiled plastic member and the plastic holders. In a final method step the thus pre-mounted housing plates are placed onto one another such that the plastic elements are positioned inwardly (relative to the housing) and are then connected to one anther by plastic connecting techniques such as an adhesive, ultrasound welding, or hot-pressing.

Preferably, at the base plate the profiled plastic member forming the insertion guide for the chip card and the two plastic holders for the strip plug are produced in a single injection molding step, and in a further injection molding step the cover plate is provided at its inner side with the plastic frame for the printed circuit board. With such a method a vertical assembly, i.e., one part is positioned above the other is possible whereby due to the injection-molded embodiment of the profiled parts, of the insertion slot and insertion channel for the chip card, of the positioning elements and connecting elements for the plastic connection a very simple manufacture is possible which does not require any finishing steps or additional steps so that a fully automated production is possible. The thus possible extremely short dimensions allows the production of the contacting unit according to PCMCIA standard size requirements which can be inserted completely into conventional PCMCIA receiving slots of a computer. The injection molding step for attaching the plastic holders, plastic frame, plastic profiled member to the tabs and brackets also increases the positioning precision and stability of the inventive chip card reader. The inventive chip card reader in its preferred application is used for securing a computer against unauthorized use whereby the securing action is realized by an inserted aid contacted chip card and can be canceled by a person authorized to use the computer.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
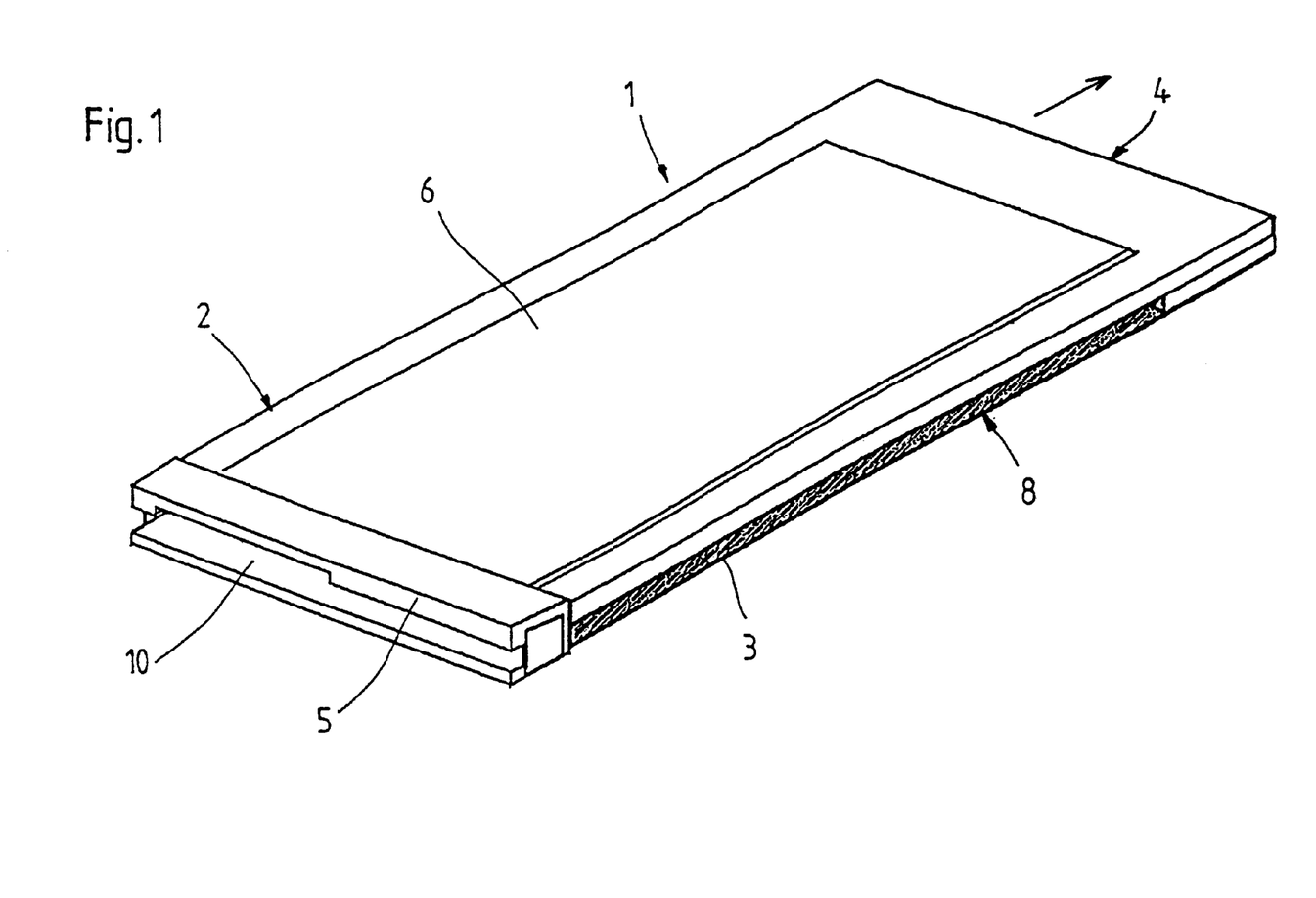
FIG. 1 shows a perspective representation of a contacting unit in its completed form.

The embodiment of the invention shown in FIG. 1 shows a contacting unit 1 as a chip card reader which is employed to provide contact to a notebook computer via a standardized PCMCIA interface. The contacting unit 1 is comprised of a two-part outer housing 2 with a base plate 3, a PCMCIA contact field in the form of a strip plug 4 with 68 poles at the leading end (with respect to the insertion direction into the notebook shown by the arrow at the forward end), an insertion guide 5 at the opposite end for insertion of a chip card 9, for example, according to ISO 78 16 standard, and a cover plate 6 extending parallel at a spacing to the base plate 3. The base plate 3 and the cover plate 6 connect the strip plug 4 rigidly with the insertion guide 5. The above mentioned parts of the contacting unit 1 are supported by the profiled plastic elements made of PCB shown in FIG. 3 and positioned in the interior of the housing. The plastic elements also secure a PCMCIA printed circuit board 7 at a spacing parallel to the base plate 3 such that between the base plate 3 and the printed circuit board 7 an insertion channel 8 for the ISO 78 16 chip card 9 is formed which can be inserted via the insertion slot 10 of the insertion guide 5 into the contacting unit 1. The chip card 9 can be inserted and removed in the direction of the double arrow shown in FIG. 5 into and from the contacting unit 1 whereby via the chip field 11 of the chip card 9 arranged at its surface and the contact field 11' at the underside of the PCMCIA printed circuit board 7 contacting is possible which allows processing of the chip card 9 via the PCMCIA card when the contacting unit 1 is inserted into the insertion slot of the notebook and is connected via the respective PCMCIA interface and the strip plug 4.

Figure 2:
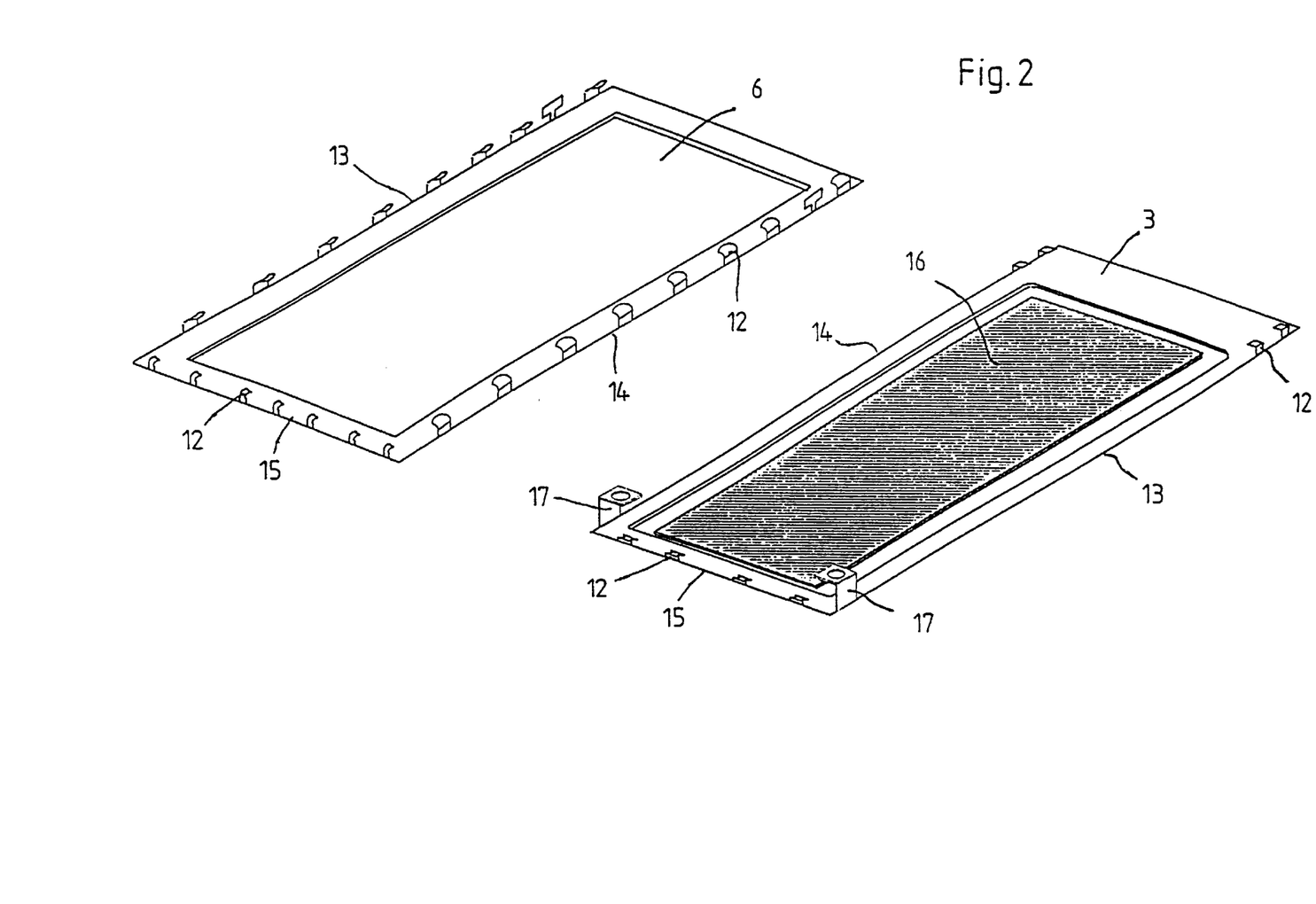
FIG. 2 shows an individual representation of the two outer housing plates of the contacting unit of FIG. 1 in the form of a base plate and a cover plate, respectively in a perspective representation of the inner side.

FIG. 2 shows the two individual plates of the outer housing, i.e., the base plate 3 in a perspective view onto the inner side and the cover plate 6, essentially rotated by 180°, also in a perspective view onto the inner side. Base plate 3 and cover plate 6 are separate, individual sheet metal parts not connected to one another. They have inwardly bent tabs 12 at the longitudinal sides 13, 14 and the rear narrow side 15 while the rarrow side leading in the insertion direction is free of such tabs in order to be able to arrange thereat the strip plug 4. In the embodiment represented in FIG. 2, the base plate 3 is provided with a reinforcement plate 16 welded thereto which allows to provide for an extremely thin housing metal of approximately 2/10 mm thickness. It should be noted that instead of a reinforcement plate 16 of metal it is also possible to use a plastic plate which can then be produced by an injection molding process in a single method step together with the other plastic elements, as will be disclosed in the following.

The tabs 12 have an L-shape, and it is suggested to produce them by stamping the sheet metal parts of the base plate 3, respectively, cover plate 6, followed by bending out of the plane by 90° in the inner direction (relative to the housing) and to preform then a further bending action by 90° inwardly (toward on another) so that the free legs extend parallel to the base plate 3 and the cover plate 6 into the future interior of the housing 2 of the contacting unit 1. This arrangement provides for an especially advantageous securing action for the injection molding process at the tabs 12. The number and arrangement of the tabs 12 at the base plate 3 and the cover plate 6 complement one another in the sense that a torsionally stiff housing results whereby it is expedient to provide the cover plate 6 with a plurality of tabs 12 while the base plate 3 is provided with tabs 12 at the transverse (narrow) side 15 where the insertion guide 5 is provided in the form of the profiled plastic member 18 and is also secured by a respective bracket 17 at each longitudinal side 13, 14. The brackets 17 are also stamped from the sheet metal material of base plate 3 and are then bent upwardly to form L-shaped brackets. They are used to delimit the insertion slot 10 of the insertion guide laterally as can be seen in FIG. 1, in order to provide a lateral guiding action for the chip card 9 to be inserted. The free legs of the brackets 17 are provided with holes in order to improve the plastic connection with the profiled plastic member 18 that provides the insertion guide 5.

Figure 4:
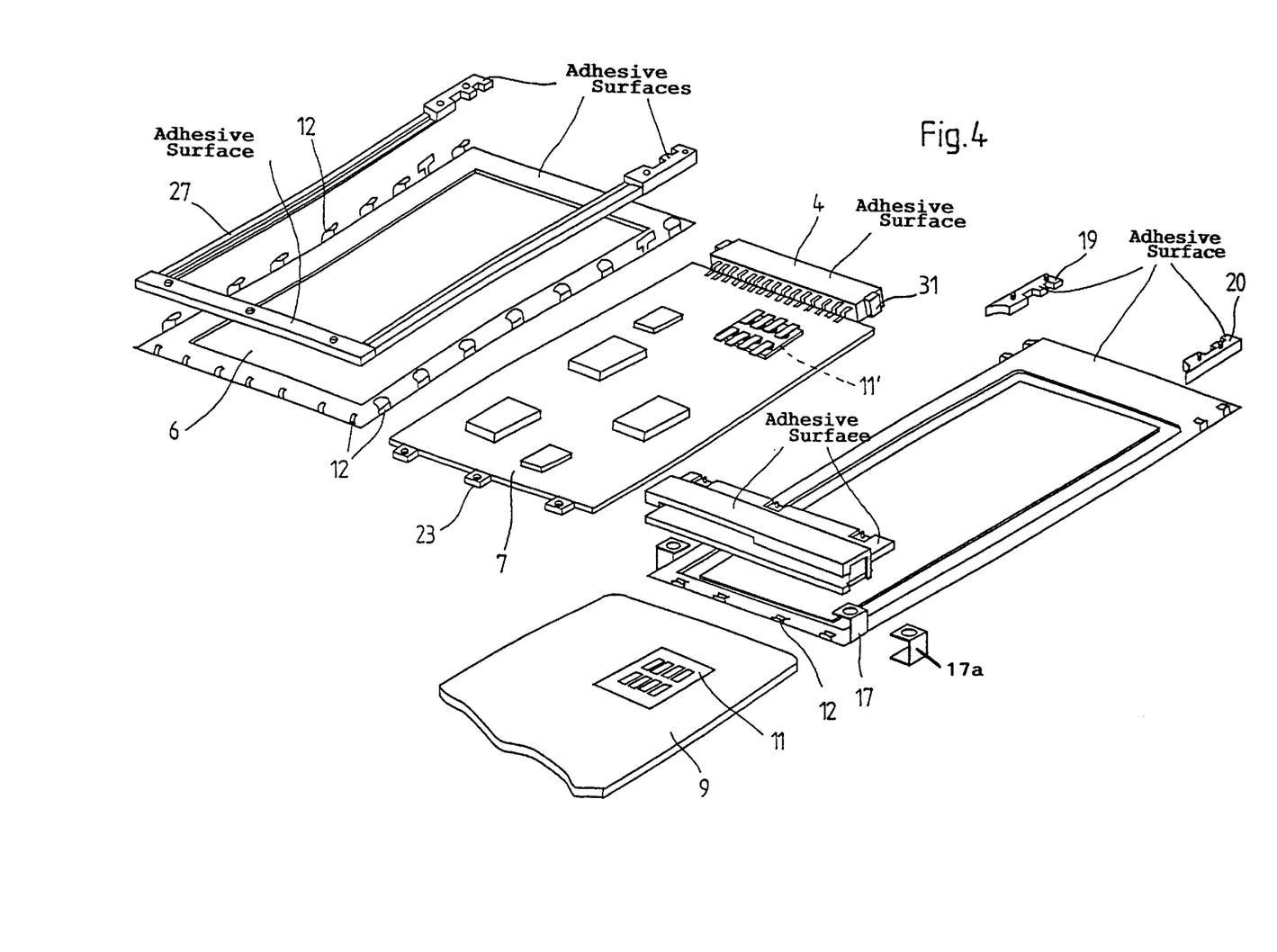
FIG. 4 shows the individual parts of the contacting unit of FIG. 1 in the form of an exploded view with the cover plate shown upside down to show the plastic frame.

In principle, it is also possible to use instead of the tabs and brackets that are stamped from the sheet metal material of the base plate and the cover plate, to provide separate securing elements which have to be (connected mechanically to the respective housing plates. FIG. 4 shows this possibility by separately shown clamp 17a. However, in the represented preferred embodiment the bracket 17 is stamped from the sheet metal part and is then bent as disclosed above.

Figure 3:
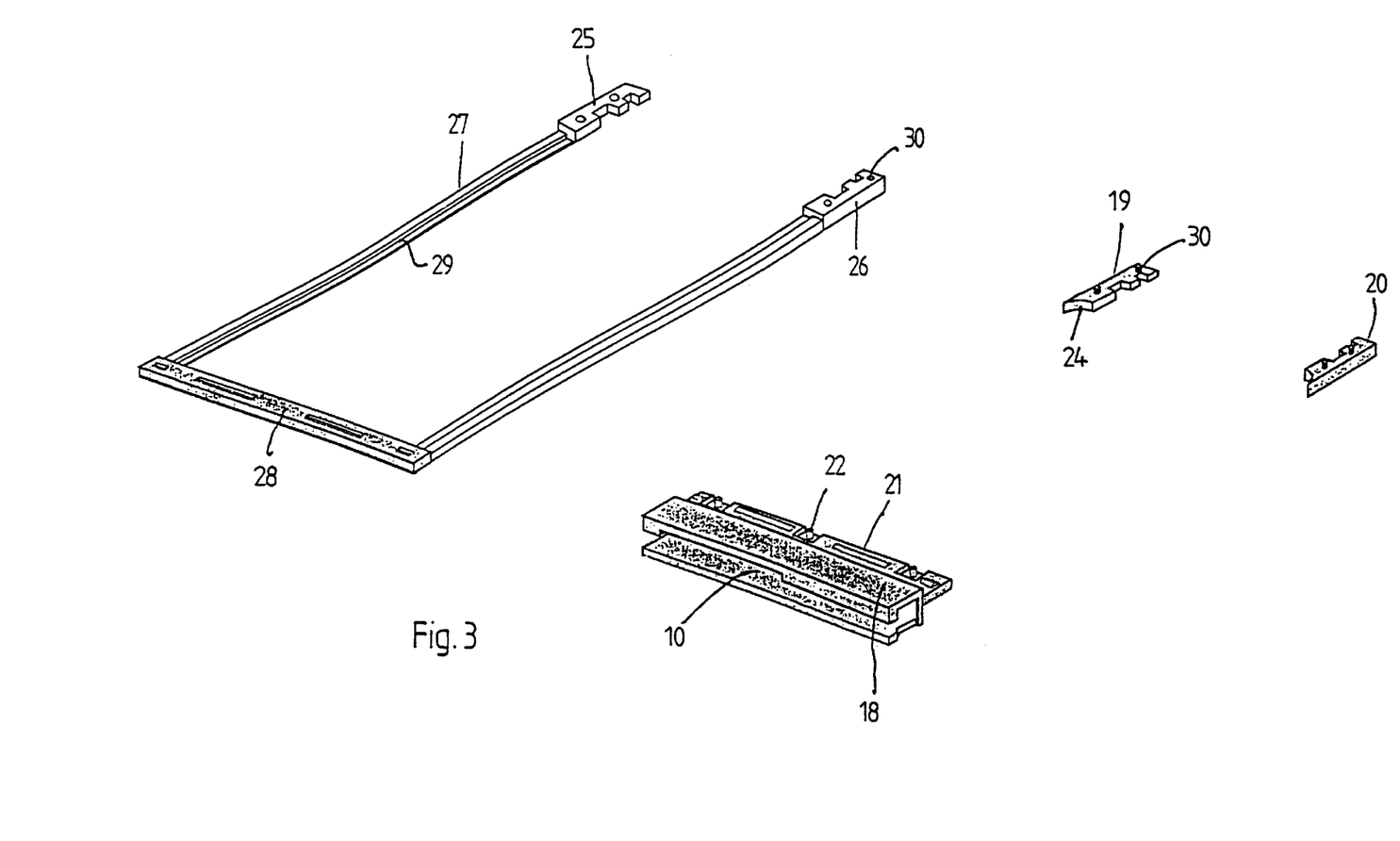
FIG. 3 shows the individual profiled plastic elements for attachment to the base plate or the cover plate in perspective representations.

FIG. 3 shows in a perspective representation the plastic elements of the contacting unit 1 used for securing the printed circuit board. In a preferred embodiment of the invention these plastic elements are not separately produced and inserted into the housing but are produced such that they form a unitary part with the respective metal plate of the housing, i.e., either the base plate or the cover plate, whereby this connection is produced by injection molding. FIG. 3 shows thus only the shape of the individual plastic elements. In analogy to the representation of FIG. 2 the plastic member 18 that forms that insertion guide 5 is represented together with the plastic holders 19, 20 which belong to the base plate 3, while the U-shaped plastic frame 27 that is correlated with the cover plate 6 is shown to the left in the drawing. This correlation is shown even more precisely in FIGS. 4 and 5 and will be explained in more detail in the following.

The profiled plastic member 18 is a unitary (monolithic) part produced by injection molding and has the shape of a bar extending over the entire narrow side 15 of the contacting unit 1 whereby it has a substantially U-shaped cross-section. The open side of the U-shape forms the insertion slot 10 whereby the bottom of the U-shape has a penetration so that the insertion slot 10 opens into the insertion channel 8. The insertion slot 10 has a width that corresponds to the width of the chip card 9 to be inserted. Accordingly, the spaced apart upper portion and lower portion of the member 18 that define the insertion slot 10 are thus laterally connected only by small stays, and the insertion slot 10 within the plastic member 18 is laterally open. The profiled plastic member 18 also has a platform-shaped projection 21 as a unitary part positioned above the insertion slot and projecting inwardly into the housing. The platform 21 is designed to provide a securing action for the circuit board 7 so as to ensure a flush arrangement of the circuit board 7 with the insertion slot 10 for which purpose positioning recesses 22 are provided into which positioning projections 23 at the printed circuit boards 7 are placed whereby the projections and the recesses match one another so that a flush mounting is achieved. At the leading end of base plate 3, viewed in the insertion direction into the computer slot, plastic holders 19, 20 are provided for securing the strip plug 4 which at the same time serve as axial abutments for limiting the insertion of chip card 9, whereby for this purpose they are provided with rounded abutment surfaces 24.

The plastic holders 19, 20 match correspondingly shaped holders 25, 26 at the free ends of the plastic frame 27 connected to the cover plate 6 whereby the plastic frame 27 at its closed side is provided with a narrow connecting bar 28 that matches the platform 21 of the profiled plastic member 18 in the assembled state. The legs of the plastic frame 27 have an inwardly open guide in the form of a step 29 for securing and holding the printed circuit board 7 which is secured by the plastic frame 27 in the mounted state. The holders 25, 26 together with the plastic holders 19, 20 serve as fixation means for the strip plug 4 connected to the printed circuit boards 7.

The plastic elements shown in FIG. 3 are provided with various positioning projections and recesses 30 for the purpose of proper positioning.

Figure 5:
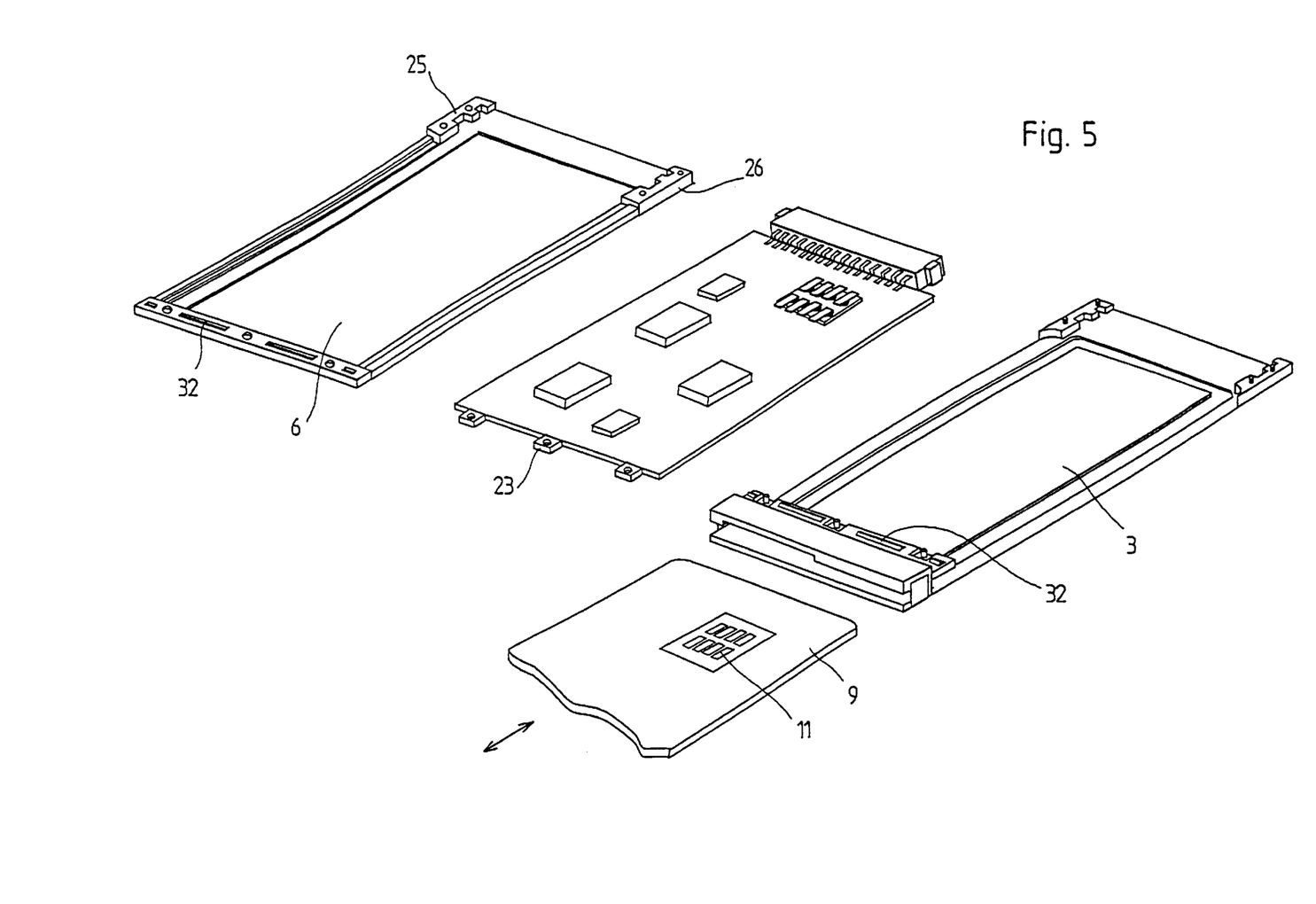
FIG. 5 shows the individual parts of the contacting unit according to FIG. 4 in an intermediate assembly state.

The aforementioned arrangement of the plastic elements at the base plate 3, respectively, the cover plate 6 as well as the arrangement of the circuit board 7 relative to these plates can be seen especially well in the exploded views of FIGS. 4 and 5 which represented different embodiments of the contacting unit 1 because according to FIG. 4 an adhesive connection of the plastic elements is envisioned while according to FIG. 5 ultrasound welding is used for connecting the plastic elements. It can be seen that the base plate 3 at the insertion end is provided at its edges with the plastic holders 19, 20 which are secured by two tabs 12, respectively. At the opposite narrow side the profiled plastic member 18 is arranged at the base plate 3 and secured by brackets 17 on either end which at the same time delimit laterally the insertion slot 10 and thus provide a lateral guiding action for the chip card 9 to be inserted. A transverse securing action is provided by the tabs 12 provided at the narrow side 15.

The printed circuit board 7 shown adjacent thereto is arranged such on the base plate 3 that the leading end having the strip plug 4 engages with laterally positioned cams 31 in corresponding recesses of the plastic holders 19, 20 and at the opposite side the positioning projections 23 of the printed circuit board 7 are positioned flush in the recesses positioning 22 of the platform 21 of the profiled plastic member 18. Accordingly, the insertion channel 8 is formed between the base plate 3 and the printed circuit board 7 which is designed to receive the chip card 9 and allows contacting of the chip contact field 11 via the contact field 11' with the PCMCIA card.

The cover plate in FIG. 4 and 5 is not represented in the assembly position but is rotated by 180° in order to show the inner side thereof. It can be seen that the cover plate 7 has correlated therewith the U-shaped plastic frame 27 which is connected by corresponding tabs 12 at the cover plate 6 and is used for mounting the printed circuit board 7 at the base plate 3. When the cover plate 6 is positioned on the base plate 3, the surfaces indicated as adhesive surfaces in the drawing will rest face to face on one another and can thus be connected by adhesives in order to provide a fixed connection of cover plate and base plate.

The embodiment represented in FIG. 5 shows energy directing sensors 32 for performing ultrasound welding of the plastic surfaces. FIG. 5, in contrast to FIG. 4, shows the correct arrangement of the plastic elements on the base plate 3 and the cover plate 6 whereby the tabs 12 are no longer visible since they are embedded in the plastic elements. This is the result of the preferred inventive manufacturing method for the inventive contacting unit including the following method steps:

1. The outer housing plates in the form base plate 3 and cover plate 6 are stamped as separate, individual sheet metal parts that are not connected to one another, whereby at the same time the tabs 12 and the brackets 17 are stamped and then bent inwardly.
2. The base plate 3, respectively, the cover plate 6 are provided in a second method step separately with the plastic holders 19, 20 and the profiled plastic member 18, respectively, the plastic frame 27 by an injection molding process in order to form unitary parts.
3. The printed circuit board 7 with its strip plug 4 is then placed from above onto the base plate 3 under formation of an insertion channel 8 and is received in the profiled plastic member 18 and the plastic holders 19, 20.
4. In the subsequent method step the thus pre-mounted housing plates with inwardly positioned plastic elements are placed on top of one another and are then connected to one another by plastic connecting techniques, for example, an adhesive connection or by ultrasound welding.

Figure 6:
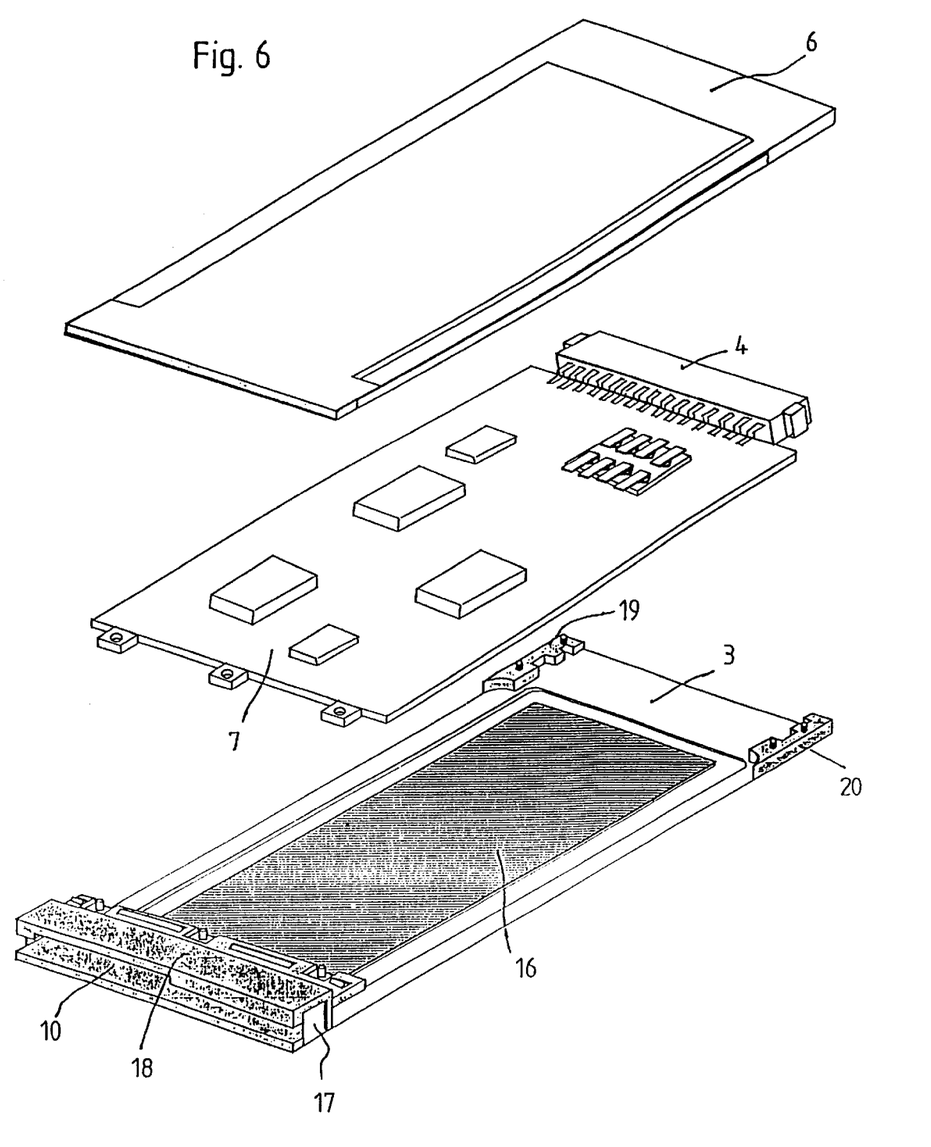
FIG. 6 shows the premounted individual parts, ready for completion of assembly, in a perspective exploded view.

FIG. 6 illustrates the vertical assembly of the three pre-assembled parts in an exploded view showing that the base plate 3 is provided by a single injection molding process at its inner side with the insertion guide 5 for the chip card in the form of the profiled plastic member 18, the two plastic holders 19, 20 for the strip plug 4 as well as with the plastic reinforcing plate 16. By embedding the tabs 12 in the plastic material during the injection molding process, the tabs 12 serve as securing elements and thus provide an intimate connection of the plate a and the plastic elements so that the tabs 12 can no longer be seen while the brackets 17 positioned laterally and within the area of the insertion slot 10 are free of plastic material in order to provide a lateral guiding action for the chip card and to also allow the width of the contacting unit 1 to be as narrow as possible within the PCMCIA standard dimensions.

The specification incorporates by reference the disclosure of European priority document 98 10 2950.7 of Feb. 20, 1998.

The present invention is, of course, in no way restricted to the specific disclosure of the specification and drawings, but also encompasses any modifications within the scope of the appended claims.

What is claimed is:

1. A contacting unit (1) comprising:

a housing comprising a base plate (3) and a cover plate (6);

said housing having two longitudinal sides (13, 14) and two narrow sides extending perpendicularly to said two longitudinal sides;

said cover plate (6) having a plastic frame (27);

a printed circuit board (7), having a strip plug (4) for contacting a port at a notebook computer and a contact field (11') for contacting a chip card (9);

said printed circuit board (7) mounted in parallel between said cover plate (6) and said base plate (3) such that between said printed circuit board (7) and said base plate (3) a slot-shaped insertion channel (8) is defined and such that said strip plug (4) is located at a first one of said two narrow sides, wherein said printed circuit board (7) is secured by said plastic frame (27);

said insertion channel (8) open at said two longitudinal sides;

said insertion channel (8) having an insertion guide (5) located at a second one (15) of said narrow sides opposite said strip plug (4);

wherein said base plate (3) and said cover plate (6) are separate stamped sheet metal parts having peripheral edges;

wherein at least said peripheral edges at said two longitudinal sides (13, 14) of said housing have inwardly bent tabs (12);

wherein said base plate (3) has plastic holders (19, 20) at said two longitudinal sides (13, 14) for securing opposite ends of said strip plug (4);

wherein said insertion guide (5) is a profiled plastic member (18) having a length matching a length of said second narrow side (15);

wherein said profiled plastic member (18) is connected to said base plate (3) and has an insertion slot (10) allowing passage of a chip card (9) into said insertion channel (8);

wherein said profiled plastic member (18) has a platform (21) projecting into said housing and providing a support surface for said printed circuit board (7);

wherein said plastic holders (19, 20) and said profiled plastic member (18) are injection-molded onto said tabs (12) of said base plate (3);

wherein said plastic frame (27) is injection-molded to said tabs (12) of said cover plate (6);

said cover plate (6) and said base plate (3) are fastened to one another by a plastic connection effected by an adhesive, ultrasound welding or hot-pressing.

2. A contacting unit (1) according to claim 1, wherein said plastic frame (27), said plastic holders (19, 20), and said profiled plastic member (18) have matching positioning projections (23) and positioning recesses (30) and wherein said plastic connection comprises adhesive surfaces or energy directing sensors (32).

3. A contacting unit (1) according to claim 1, wherein said tabs (12) are stamped from said sheet metal parts and bent to an L-shape.

4. A contacting unit (1) according to claim 1, wherein said cover plate (6) has a plurality of said tabs (12) for securing said plastic frame (27) to said cover plate (6), wherein said base plate (3) has a plurality of said tabs (12) at said second narrow side (15) for securing said profiled plastic member (18), and wherein said base plate (3) further has two brackets (17) positioned opposite one another at said longitudinal sides (13, 14) of said housing for laterally securing said profiled plastic member (18), wherein said brackets (17) delimit laterally said insertion slot (10) and provide a lateral guiding action for a chip card (9) to be inserted into said insertion channel (8).

5. A contacting unit (1) according to claim 1, wherein said profiled plastic member (18) is a unitary part and has a U-shaped cross-section, wherein an open side of said U-shaped cross-section forms said insertion slot (10) and wherein a bottom of said U-shaped cross-section has a penetration into said insertion channel (8), wherein said penetration has a length matching a width of a chip card (9) to be inserted into said insertion channel (8), wherein said platform (21) extends as a unitary part from an upper leg of said U-shaped cross-section above said insertion slot (10), wherein said platform (21) has positioning recesses (22) engaged by positioning projections (23) of said printed circuit board (7).

6. A contacting unit (1) according to claim 1, wherein said plastic holders (19, 20) are axial abutments limiting an insertion depth of a chip card (9) to be inserted into said insertion channel (8).

7. A contacting unit (1) according to claim 1, wherein said plastic frame (27) is U-shaped and has two legs and a connecting bar (28) connecting said two legs (29), wherein said connecting bar (28) matches said platform (21).

8. A contacting unit (1) according to claim 7, wherein said two legs (29) have free ends matching said holders (19, 20).

9. A contacting unit (1) according to claim 1, further comprising a reinforcement plate (16) fastened to a side of said base plate (3) facing said insertion channel (8) by an adhesive, a welding connection or injection molding.

10. A contacting unit (1) according to claim 9, wherein said reinforcement plate (16) is a metal plate or a plastic plate.

11. A contacting unit (1) according to claim 9, wherein said reinforcement plate (16) is spring-elastic.

* * * * *